United States Patent [19]

Nakamura

[11] Patent Number: 5,044,146

[45] Date of Patent: Sep. 3, 1991

[54] OSCILLATING-TYPE MOWING APPARATUS

[75] Inventor: Masaharu Nakamura, Tokyo, Japan

[73] Assignee: Komatsu Zenoah Company, Tokyo, Japan

[21] Appl. No.: 527,322

[22] Filed: May 23, 1990

[30] Foreign Application Priority Data

May 24, 1989 [JP] Japan .................. 1-128636

[51] Int. Cl.$^5$ ................ A01D 34/68; A01D 34/76
[52] U.S. Cl. .................... 56/11.3; 56/17.6; 56/246; 56/293; 56/DIG. 6
[58] Field of Search ............ 56/11.3, 17.6, 239, 56/240, 241, 246, 247, 248, 293, 255, 295, DIG. 6; 30/264, 265, 206-210

[56] References Cited

U.S. PATENT DOCUMENTS

| 1,110,058 | 9/1914 | Hurley . | |
|---|---|---|---|
| 2,119,683 | 5/1936 | Hevraumont | 30/43 |
| 2,976,655 | 7/1959 | Speckman | 56/255 |
| 3,472,007 | 8/1967 | Green | 56/25.4 |
| 3,538,690 | 3/1967 | Hinks et al. | 56/26.5 |
| 3,618,304 | 7/1970 | Hundhausen | 56/16.9 |
| 3,631,658 | 1/1972 | Green | 56/11.3 |
| 3,701,238 | 10/1972 | Hintze, Jr. | 56/10.4 |
| 3,740,936 | 6/1973 | Berger | 56/246 |
| 3,857,177 | 12/1974 | Karubian et al. | 30/216 |
| 4,196,566 | 4/1980 | Donnelley | 56/8 |
| 4,310,999 | 1/1982 | Onoue | 56/295 |
| 4,451,983 | 6/1984 | Johnson et al. | 30/276 |
| 4,848,846 | 7/1989 | Yamada et al. | 30/276 |
| 4,881,363 | 11/1989 | Terai et al. | 56/255 |
| 4,987,732 | 1/1991 | Terai et al. | 56/255 |

FOREIGN PATENT DOCUMENTS

| 28443 | 4/1970 | Australia . |
| 476883 | 9/1976 | Australia . |
| 522302 | 11/1977 | Australia . |
| 68701 | 3/1981 | Australia . |
| 320330 | 2/1975 | Austria . |
| 117848 | 9/1984 | European Pat. Off. . |
| 257566 | 3/1988 | European Pat. Off. . |
| 337428 | 10/1989 | European Pat. Off. . |
| 2058984 | 6/1972 | Fed. Rep. of Germany . |
| 3812272 | 11/1988 | Fed. Rep. of Germany . |
| 2357162 | 6/1977 | France . |
| 516273 | 1/1972 | Switzerland . |
| 2199226 | 7/1988 | United Kingdom . |
| 8909538 | 10/1989 | World Int. Prop. O. . |

Primary Examiner—Hoang C. Dang
Attorney, Agent, or Firm—Sandler, Greenblum & Bernstein

[57] ABSTRACT

Disclosed herein is a mowing apparatus including: a motive power source for supplying rotating motion; a mowing head; a pair of first and second cutting disks slidably superposed with each other, each of the disks including a plurality of peripheral cutting teeth and the first and second cutting disks being oscillatably mounted to the mowing head; a mechanism for reciprocatively oscillating the first and second cutting disks oppositely with each other within a predetermined oscillating range, the reciprocatively oscillating mechanism being accommodated in the mowing head and adapted to be driven by the rotational motion supplied form the motive power source; and a mechanism for changing the mounting position of the first and second cutting disks about the mowing head in the circumferential directions of the cutting disks so that a portion to be used for mowing in the first and second cutting disks can be changed without removing the first and second cutting disks from the apparatus, the mounting position changing mechanism being adapted to be driven by the rotating motion of the motive power source.

8 Claims, 2 Drawing Sheets

OSCILLATING-TYPE MOWING APPARATUS

BACKGROUND OF THE INVENTION

1. Field of the Invention

The present invention relates to a mowing apparatus, and in particular an oscillating-type mowing apparatus with two oscillatable cutting disks.

2. Description of the Prior Art

One example of an oscillating-type mowing apparatus is illustrated in European Patent Application No. 257,566 filed by the applicant of the present invention. Two superposed cutting disks each having a plurality of cutting teeth along the outer periphery of the disk are used in the mowing apparatus of that patent application. The cutting disks are operatively mounted to a mowing head of the apparatus. The two cutting disks reciprocatively oscillate in opposite directions within a predetermined oscillating range.

This apparatus provides high cutting performance with superior operation at a high level of safety. However, in this type of mowing apparatus provided with such oscillating cutting disks, there is a tendency that only a part of the cutting disks, that is only the cutting teeth positioned at the side of the cutting disks normally used in the mowing operation are fully utilized. This tendency leads to uneven wear of the teeth of the cutting disks. This gives rise to a problem that shortens the life of the cutting disks of the apparatus. In this case, consideration has been given to changing the mounting position of the cutting disks with respect to the mowing head of the apparatus by removing the cutting disks from the mowing head and then mounting them to the head again after changing the relative mounting position thereof in the circumferential direction of the disks. However, the operation of the changing the mounting position is very troublesome, so this approach is therefore not desirable.

SUMMARY OF THE INVENTION

An object of the present invention is to provide, with due consideration to the problem of such a conventional apparatus, a mowing apparatus with two oscillating cutting disks which can easily prevent uneven wear from being caused in the teeth of the cutting disks without removing the disks from the a mowing head of the apparatus.

This object is achieved in the present invention by a mowing apparatus comprising (1) a motive power source for supplying rotating motion; (2) a mowing head; (3) a pair of first and second cutting disks slidably superposed with each other, each of the disks including a plurality of peripheral cutting teeth and the first and second cutting disks being oscillatably mounted to the mowing head; (4) means for reciprocatively oscillating the first and second cutting disks oppositely with each other within a predetermined oscillating range, the reciprocatively oscillating means being accommodated in the mowing head and adapted to be driven by the rotational motion supplied from the motive power source; and (5) means for changing the mounting position of the first and second cutting disks about the mowing head in the circumferential directions of the cutting disks so that a portion to be used for mowing in the first and second cutting disks can be changed without removing the first and second cutting disks from the apparatus, the mounting position changing means being adapted to be driven by the rotating motion of the motive power source.

As a result, in accordance with the mowing apparatus as defined in the claim, the mounting position of the two cutting disks with respect to the mowing head can be easily changed in the circumferential direction of the disks by the desired amount without removing the cutting disks therefrom. Therefore, the worn teeth of the cutting disks can be displaced from the normally used position in the disks without any trouble, and the mowing action can be performed with teeth which are not worn. This means that the cutting disks become durable, thus leading to lengthening the life thereof.

BRIEF DESCRIPTION OF THE DRAWINGS

These and other objects, features, and advantages of the present invention will become more apparent from the following description of the preferred embodiments taken in conjunction with the accompanying drawings, in which:

FIG. 3 is a horizontal sectional view taken along the line III—III of FIG. 2.

DETAILED DESCRIPTION OF THE PREFERRED EMBODIMENTS

Figure 1:
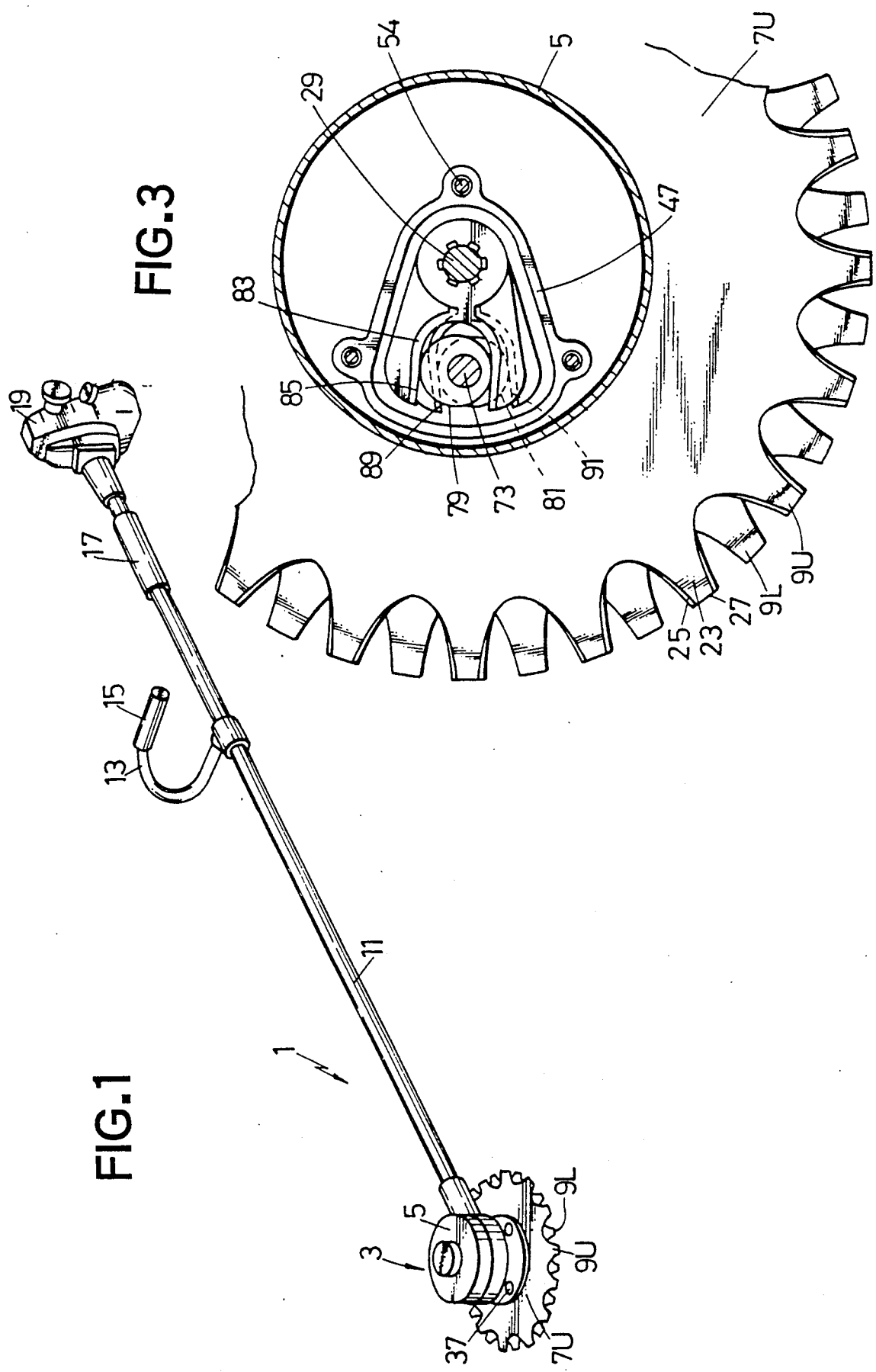
FIG. 1 is a perspective view showing a mowing apparatus of the present invention.

Now referring to FIG. 1, a mowing apparatus 1 is provided with a mowing head 3 which comprises a housing 5 and a pair of first and second cutting disks 7U, 7L each provided with a plurality of cutting teeth 9U, 9L along its outer periphery. The first and second cutting disks 7U and 7L are oscillatably mounted to the housing 5 at the lower side thereof. A hollow connecting pipe 11 is provided on the rear side of the mowing head 3, which extends to the upper rear direction from the mowing head 3. A handle 13 with a grip 15 is mounted on the connecting pipe 11 at roughly the middle of the connecting pipe 11. Another grip 17 is provided onto the upper portion of the connecting pipe 11. An engine 19 is provided at the upper end of the connecting pipe 11 as one example of a motive power source. An electric motor may also be substituted for the engine 19 as a motive power source. A transmission shaft 21 connected to the engine 19 at one end thereof passes through the hollow section of the connecting pipe 11. The rotary motion of the engine 19 is transmitted to the inside of the housing 5 through the transmission shaft 21.

As shown in FIG. 3, a plurality of cutting teeth 9U, 9L are arranged at the peripheries of the first and second cutting disks 7U, 7L, respectively. Each of the teeth 9U, 9L comprises a major surface 23, two acute side edges 25, and an outer peripheral edge 27. The outer peripheral edge 27 is provided substantially perpendicular to the major surface 23 and does not have a cutting edge. The first and second cutting disks 7U, 7L are slightly bent inwardly each other so that the superposed teeth 9U, 9L are pressed together by elastic contact only at the tip portions thereof.

Figure 2:
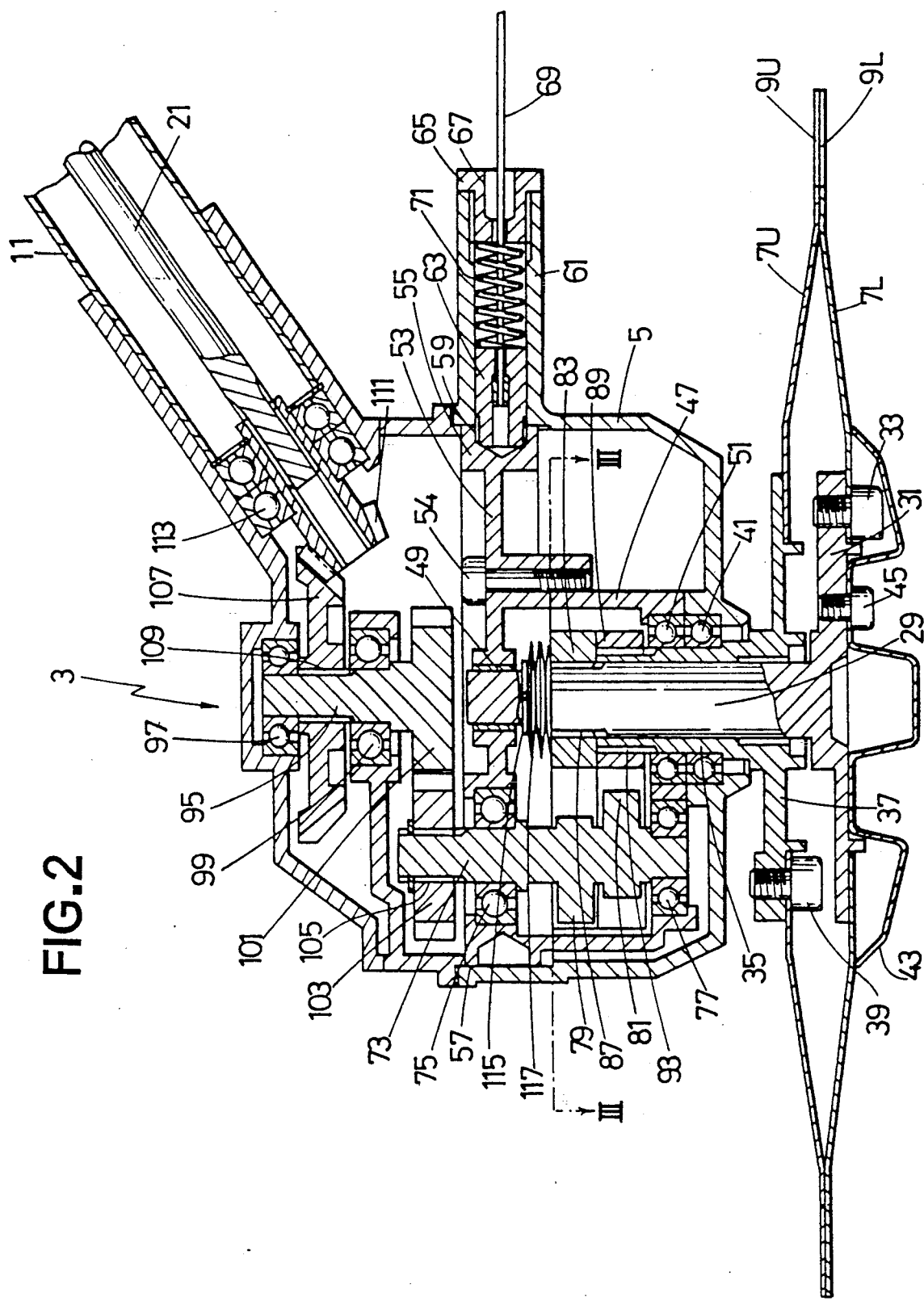
FIG. 2 is a vertical sectional view of a mowing head of the mowing apparatus of the present invention.

A detailed explanation of the interior of the housing 5 will now be described with reference to FIG. 2.

The first cutting disk 7L is fixed to a flange portion 31 which is integrally formed on a lower end of a first shaft 29 by means of bolts 33. The second cutting disk 7U is slidably superposed on the first cutting disk 7L and is fixed to a flange portion 37 which is integrally formed on a lower end of a tubular second shaft 35 by means of bolts 39. The first shaft 29 is coaxially and rotatably inserted into the tubular second shaft 35. The first shaft 29 is also slidable in the axial direction in the second shaft 29. The second shaft 35 is rotatably provided in the housing 5 through a bearing 41. A cover 43 is mounted on the bottom surface of the flange 31 of the first shaft 29 by a screw 45 to cover the bolts 33.

The mowing head 3 includes means for changing the mounting position of the first and second cutting disks 7U, 7L in the circumferential directions of the cutting disks 7U and 7L. The mounting position changing means comprises a positioning member 47 in which means for reciprocatively oscillating the cutting disks is installed. Further, the mounting position changing means includes a drive gear 101 and a driven gear 103, a detailed structures thereof are described later.

Referring to the detailed structure of the positioning member 47, the upper end of the first shaft 29 is rotatably supported to the positioning member 47 through a bearing 49, and the middle portion of the second shaft 35 is also rotatably supported to the positioning member 47 through a bearing 51. The positioning member 47 has a disk-shaped plate portion 53. A peripheral portion 55 of the disk-shaped plate portion 53 has a circular outer periphery 57 which slidably contacts on an inner surface of the housing 5. Therefore, the positioning member 47 is provided rotatably in the housing 5. On the outer periphery 57, there is formed a plurality of concaves 59. An tubular projection 61 projecting outwardly is provided on the housing 5 and an engaging member 63 engageable with one of the concaves 59 is slidably provided in a bore in the tubular projection 61. The engaging member 63 serves to position the positioning member 47 relative to the housing 5 by engaging with the concave 59. A spring bearing 65 is secured to the tip of the tubular projection 61. The spring bearing 65 has a hole 67 which passes the inside of the tubular projection 61. One end of a wire 69 which extends to the outside of the tubular projection 61, running through the hole 67 of the spring bearing 65, is joined to the engaging member 63. The other end of the wire 69 is joined to an operating lever (not shown in the drawing) which is provided close to the handle 13 on the connecting pipe 11. A spring 71 is provided between the spring bearing 65 and the engaging member 63 in the tubular projection 61 as a biasing means. The biasing force of the spring 71 normally presses the engaging member 63 toward the concave 59 of the plate 53 so as to engage with the concave 59.

In this configuration, when the wire 69 is pulled under tension by means of the operating lever (not shown in the drawing) so as to act against the biasing force of the spring 71, the engaging member 63 is released from the state of engagement with the concave 59 of the plate 53 and then the positioning member 47 becomes rotatable within the housing 5. After the positioning member 47 has been rotated at a necessary angle, the wire 69 is slackened by means of the operating lever, and the engaging member 63 is caused to engage one of the concaves 59 of the plate portion 53 by the biasing force of the spring 71, so that the positioning member 47 is rotationally positioned and therefore ceases its rotation with respect to the housing 5.

The means for reciprocatively oscillating the cutting disks will now be explained. The oscillating means has means for converting rotating motion supplied from the motive power source into two oscillating motions. Specifically, as shown in FIG. 2 and FIG. 3, a cam shaft 73 is rotatably mounted to the positioning member 47 through a pair of bearings 75, 77. A pair of first and second circular eccentric cam plates 79, 81 are integrally provided on the cam shaft 73 in the axial direction thereof. The first and second eccentric cam plates 79, 81 are symmetrically eccentrically positioned with respect to the axis of the cam shaft 73. A first arm 83 having a U-shaped concave portion 85 receives the first eccentric cam plate 79 in the concave portion 85 and the base portion of the first arm 83 is axially slidably coupled to the first shaft 29 with a spline 87. A second arm 89 having a U-shaped concave portion 91 receives the second eccentric cam plate 81 in the concave portion 91 and the base of the second arm 89 is coupled to the second shaft 35 with a spline 93. As stated above, since the first and second cam plates 79, 81 are radially symmetrically positioned on the cam shaft 73 with respect to the axis of the cam shaft 73 with each other, the first and second arms 83, 89 are pivoted in opposite directions when the cam shaft 73 rotates. Therefore, the rotating motion of the cam shaft 73 is converted into two oscillating motions in the first and second arms 83, 89. Accordingly, the first and second cutting disks 7L, 7U are reciprocally oscillated in opposite directions through the first and second shafts 29, 35.

In the housing 5, an intermediate shaft 95 is rotatably provided on the same center line as the common rotational axis of the first and second shafts 29, 35 through a pair of bearings 97, 99. A drive gear 101 is integrally provided at the lower end of the intermediate shaft 95. A driven gear 103 which is in mesh with the drive gear 101 is fixedly fitted to the cam shaft 73 by a spline 105. In this construction, the driven gear 103 can rotate and/or orbit around the drive gear 101 according to the rotation of the drive gear 101. Namely, when the driven gear 103 rotates, the cam shaft 73 also rotates and drives the above-mentioned rotating motion converting means. The first and second cutting disks 7U, 7L then oscillate in opposite directions as stated above. When the driven gear 101 rotates under the condition that the engagement member 63 is released from the concave 59 of the positioning member 47, the cam shaft 73 together with the positioning member 47 and the first and second arms 83, 89 orbits with respect to the first and second shafts 29, 35. As a result, the first and second shafts 29, 35 rotate, thereby revolving the first and second cutting disks 7U, 7L, thereby changing the mounting position of the cutting disks 7U, 7L about the mowing head 3 in the circumferential direction of the disks.

Specifically, in this structure, the driven gear 103 can orbits the circumference of the drive gear 101 only in the condition that the positioning member 47 can be rotated. Namely, when the wire 69 is pulled, the positioning member 47 is released from its non-rotating state and becomes rotatable. In this state, when the drive gear 101 rotates, the driven gear 103 is orbited around the drive gear 101. As a result, the cam shaft 73 is also orbited around the drive gear 101 together with the positioning member 47, thereby the first and second cutting disks 7U, 7L can be revolved. On the other hand, after the first and second cutting disks 7U, 7L have rotated through the necessary angle, the wire 69 is released. Then the positioning member 47 is secured to the housing 5 by the engagement of the engagement member 57 and a concave 59 of the plate portion 53 of the positioning member 47 and ceases the rotating motion. In this state, when the drive gear 101 rotates, the driven gear 103 is rotated without orbiting and causes the cam shaft 73 to rotate. As a result, the first and second cutting disks 7U, 7L can oscillate reciprocatingly without revolving for the purpose of changing the mounting position as described above.

A bevel gear 107 is fixedly fitted to the upper portion of the intermediate shaft 95 through a spline 109. The bevel gear 107 is in engagement with a bevel gear 111. The bevel gear 111 is fixedly fitted to the transmission shaft 21 which is fitted rotatably through a bearing 113 to the housing 5. The transmission shaft 21 passes through the connecting pipe 11 mounted to the housing 5 and is connected to the engine 19.

In this embodiment, there is provided biasing means which biases the first cutting disk 7U relative to the second cutting disk 7L so that the first and second cutting disks 7U, 7L are pressed to each other. Specifically, a snap ring 115 is mounted onto the first shaft 29 and an elastic body such as a plurality of disk springs 117 is disposed between the snap ring 115 and the first arm 83. Accordingly, the first shaft 29 is biased upwardly against the first arm 83 which is abutted to the upper end surfaces of the second shaft 35 and second arm 89 by the biasing force of the disk springs 117, and therefore the first cutting disk 7L is pressed against the second cutting disk 7U. Because the first and second cutting disks 7U, 7L are slightly bent inwardly one another so that the superposed teeth 9U, 9L are pressed together only at their tip portions, adequate cutting pressure is produced between the teeth of the first and second cutting disks 7U, 7L. Superior cutting force is provided at the teeth 9U, 9L by the pressure provided between the disks. In addition, grass and the like are not likely to enter between the upper and lower teeth 9U, 9L.

An operational description of this embodiment will be given, based on the above construction. When the engine 19 is driven and the transmission shaft 21 is rotated, the drive gear 21 is rotated through the bevel gear 111, the bevel gear 107, and the intermediate shaft 95. In this case, if the positioning member 47 is in a state that the positioning member 47 is secured relative to the housing 5, the driven gear 103 is rotated without orbiting around the first and second shafts 29, 35. Accordingly, the cam shaft 73 is rotated, and the first and second arms 83, 89 are pivoted in opposite directions with each other according to the rotation of the first and second eccentric cam plates 79, 81. Therefore, the first and second shafts 29, 35 are oscillated reciprocatingly, and therefore the cutting disks 7L, 7U are also reciprocatively oscillated within a predetermined angle, thus accomplishing shearing mode as scissors. In this state, the operator grips the grip 15 on the handle 13 and mows the grass or the like, using the teeth 9L, 9U of the first and second cutting disks 7L, 7U.

When the operator would like to change the mounting position of the cutting disks 7U, 7L due to the wear of the teeth, he pulls the wire 69 with the operating lever while the engine 19 is running. Then, engaging member 63 is released from the concave 59 of the plate portion 53, so that the positioning member 47 can revolve. As a result, in accordance with the rotation of the drive gear 101, the driven gear 103 and the cam shaft 73 are orbited together with the positioning member 47 around the first and second shafts 29, 35. Accordingly, the first and second cutting disks 7L, 7U revolve through the first and second arms 83, 89 and the first and second shafts 29, 35. After the first and second cutting disks 7L, 7U have revolved by the necessary amount, the operator releases the wire 69. As a result, the engaging member 63 engages with the concave 59 of the plate 53 and the revolution of the positioning member 47 is checked. The first and second cutting disks 7L, 7U stop revolving and once again oscillate reciprocatingly. The operator, by using the operating lever to pull the wire 69, can revolve the first and second cutting wheels 7L, 7U automatically at the necessary time by the necessary amount without removing the cutting disks.

As a result, the two cutting disks can be rotated by the desired amount to change the mounting position of the cutting disks with respect to the mowing head 3 in the circumferential direction. For this reason the worn teeth in the cutting disks can be displaced without removing the cutting disks from the mowing section of the apparatus, and the mowing action can be performed with teeth which are not worn. This can improve the durability of the cutting disks without any troublesome operation.

It must be understood that the invention is in no way limited to the above embodiments and that many changes may be brought about therein without departing from the scope of the invention as defined by the appended claims.

What is claimed is:

1. A mowing apparatus comprising:
   a motive power source for supplying rotating motion;
   a mowing head;
   shaft means for supporting a pair of cutting disks;
   a pair of first and second cutting disks slidably superposed with respect to each other, each of said disks including a plurality of peripheral cutting teeth, said first and second cutting disks being oscillatably mounted to the mowing head through said shaft means;
   means for reciprocatively oscillating said first and second cutting disks in opposite directions with respect to each other within a predetermined oscillating range through said shaft means, said reciprocatively oscillating means being provided in said mowing head and adapted to be driven by the rotational motion supplied from said motive power source; and
   means for intermittently changing the mounting position of said first and second cutting disks about said mowing head in the circumferential direction of said cutting disks so that a portion to be used for mowing in said first and second cutting disks can be changed without removing said first and second cutting disks from said mowing head, said mounting position changing means being adapted to be driven by the rotating motion of said motive power source.

2. The mowing apparatus of claim 1, wherein said shaft means comprises:
   a first shaft coupled to said first cutting disk; and
   a tubular second shaft, into which said first shaft is rotatably and coaxially inserted, coupled to the second cutting disk; and
   wherein said reciprocatively oscillating means comprises means for converting the rotating motion from said power source into two oppositely and reciprocatively rotating motions of said first and second shafts within the predetermined angle in opposite directions, said converting means being linked with said first and second shafts.

3. The mowing apparatus of claim 2, wherein said mounting position changing means comprises:
   a drive gear rotated by the rotating motion of said motive power source, said drive gear having the same rotational axis as the common axis of the first and second shafts;
   a driven gear which is in mesh with said drive gear so as to be rotated or orbited according to the rotation of said drive gear, wherein said driven gear is constituted so as to rotate said first and second shafts to revolve said first and second cutting disks only when said driven gear is orbited; and
   means for allowing said driven gear to be shiftable between two states, in one of said states said driven gear can be orbited and in the other of said states the driven gear cannot be orbited.

4. The mowing apparatus of claim 3, wherein the mowing apparatus further comprises a housing for said mowing head in which said reciprocatively oscillating means and said mounting position changing means are housed, in which said allowing means comprises:
   a positioning member rotatably provided within said housing, said positioning member being adapted to rotate said first and second shafts to which said disks are fixed through said reciprocatively oscillating means in accordance with the orbiting motion of said driven gear; and
   means for securing said positioning member to said housing in such a manner that only when said securing means is released is the positioning member capable of rotating.

5. The mowing apparatus of claim 4, wherein said positioning member comprises a circumferential portion, and said securing means comprises a plurality of concaves formed on said circumferential portion of said positioning member; and
   an engaging member projectably provided on said housing so that only when said engaging member is released from engagement with said concave, said positioning member can be rotated relative to said housing in accordance with the orbiting motion of said drive gear.

6. The mowing apparatus of claim 5, wherein said securing means further comprises:
   biasing means for biasing said engaging member towards said concave to engage said engaging member with said concave; and
   means for releasing said engaging member from said concave by moving said engaging member in an opposite direction to said concave against the biasing force of said biasing means.

7. The mowing apparatus of claim 6, wherein said housing is provided with a tubular projection in which said engaging member is projectingly provided so as to engage with said concave, and said biasing means comprises a spring provided in said tubular projection, and said spring biases said engaging member against said concave in such a manner that said engaging member is pressed to said concave.

8. The mowing apparatus of claim 3, wherein said rotating motion converting means comprises:
   a cam shaft fitted to said driven gear so as to be rotated or orbited in accordance with said driven gear;
   first and second eccentric cam plates eccentrically fixed to said cam shaft in vertical direction of said cam shaft so as to be radially symmetrical with each other with respect to a central axis of said cam shaft; and
   first and second arms each having opposite ends, a concave portion being formed at one end thereof, and the other ends of said first and second arms being coupled to said first and second shafts, respectively, each concave portion of said first and second arms being adapted to receive each of said first and second cam plates, respectively, in such a manner that said first and second arms can be pivotably oscillated in relatively opposite directions to each other in accordance with the rotation of said first and second cam plates, whereby said first and second cutting disks are reciprocatively oscillated in relatively opposite directions about an axis of said first and second shafts through a predetermined angle.

* * * * *

UNITED STATES PATENT AND TRADEMARK OFFICE
CERTIFICATE OF CORRECTION

PATENT NO. : 5,044,146
DATED : September 3, 1991
INVENTOR(S) : M. NAKAMURA

It is certified that error appears in the above-indentified patent and that said Letters Patent is hereby corrected as shown below:

On the Title Page:

At the References, change "Hevraumont" (second concurrence) to ---Nevraumont---.
At the Abstract, line 12, change "form" to ---from---.

At column 1, line 47, after "the" (second occurrence) delete ---a---.
At column 4, line 53, change "orbits" to ---orbit---.

Signed and Sealed this

Twenty-third Day of August, 1994

Attest:

BRUCE LEHMAN

Attesting Officer

Commissioner of Patents and Trademarks